US012571711B2

(12) United States Patent
Fläschner et al.

(10) Patent No.: US 12,571,711 B2
(45) Date of Patent: Mar. 10, 2026

(54) APPARATUS AND METHOD FOR DETERMINING MECHANICAL PROPERTIES OF A SYSTEM

(71) Applicant: Nanosurf AG, Liestal (CH)

(72) Inventors: Gotthold Fläschner, Zurich (CH); Patrick Frederix, Bettingen (CH); Daniel Müller, Basel (CH); David Martinez-Martin, Sydney (AU)

(73) Assignee: Nanosurf AG, Liestal (CH)

( * ) Notice: Subject to any disclaimer, the term of this patent is extended or adjusted under 35 U.S.C. 154(b) by 287 days.

(21) Appl. No.: 18/257,304

(22) PCT Filed: Dec. 15, 2021

(86) PCT No.: PCT/EP2021/085901
§ 371 (c)(1),
(2) Date: Jun. 14, 2023

(87) PCT Pub. No.: WO2022/129176
PCT Pub. Date: Jun. 23, 2022

(65) Prior Publication Data
US 2024/0035945 A1      Feb. 1, 2024

(30) Foreign Application Priority Data
Dec. 15, 2020    (LU) ........................................ 102351

(51) Int. Cl.
*G01L 1/16*          (2006.01)
*G01N 11/16*         (2006.01)

(52) U.S. Cl.
CPC .............. *G01N 11/16* (2013.01); *G01L 1/162* (2013.01)

(58) Field of Classification Search
CPC ................................. G01N 11/16; G01L 1/162
(Continued)

(56) References Cited

U.S. PATENT DOCUMENTS 5,509,298 A * 4/1996 Cheema ................. G01N 33/32
                                                              73/54.39
5,652,386 A * 7/1997 Dimarogonas .......... G01H 1/16
                                                              702/56
(Continued)

FOREIGN PATENT DOCUMENTS

WO       WO-2012037695 A1 * 3/2012   ............... G01L 1/24

OTHER PUBLICATIONS

Stahl Stefan et al: "Photothermal cantilever actuation for fast single-molecule force spectroscopy", Review of Scientific Instruments 89, 073702 (2009), American Institute of Physics, Melville, NY, US.
Robert Walder et al: "Rapid Characterization of a Mechanically Labile α—Helical Protein Enabled by Efficient Site-Specific Bioconjugation", Journal of the American Chemical Society, 2017, 139, 9867-9875, ACS Publications, Washington, DC, US.
(Continued)

*Primary Examiner* — Robert R Raevis
(74) *Attorney, Agent, or Firm* — Caesar Rivise, PC

(57)          ABSTRACT
The invention relates to an apparatus for determining mechanical properties, more particularly rheological properties, of a system, having an oscillatable contact element and having a further contact element, in which apparatus the two contact elements are arranged in such a manner relative to one another that they can be operatively connected to one another by means of the system, having a device for photothermally exciting the oscillatable contact element, and with a device for detecting vibrations in the excited oscillatable contact element, wherein both the excitation device and the detection device interact with the oscillatable contact element, wherein the oscillatable contact element and the system can be excited to oscillate with different frequencies and/or with one or more frequency sweeps.

18 Claims, 3 Drawing Sheets

(58) Field of Classification Search

Figures 1, 2:
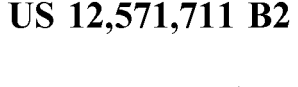

USPC ...... 73/54.23, 54.24–54.27, 54.41, 808–813, 73/815; 356/32, 614, 615; 374/46–51

See application file for complete search history.

(56) References Cited

U.S. PATENT DOCUMENTS

| | | |
|---|---|---|
| 6,330,824 B1 | 12/2001 | Erie et al. |
| 7,959,873 B1 | 6/2011 | Roukes et al. |
| 7,989,198 B2 | 8/2011 | Roukes et al. |
| 8,845,968 B2 | 9/2014 | Day |
| 2003/0230136 A1 | 12/2003 | Wright |
| 2008/0223121 A1 | 9/2008 | Lin et al. |
| 2016/0061708 A1* | 3/2016 | Kravitz ................ G01N 29/036 |
| | | 73/54.41 |

OTHER PUBLICATIONS

Ramos D et al: "Phototermal self-excitation of nanomechanical resonators in liquids", Applied Physics Letters 92, 173108 (2008), American Institute of Physics, College Park, MD, US.

Park J W et al: "Continuous monitoring of insulin attachment kinetics on photohermally actuated microcantilever biosensor", Transducers 2009, IEEE, Denver, CO, US.

Naik T et al: "Dynamic response of a cantilever liquid near a solid wall", Sensors and Actuators A 102 (2003) 240-254, Science Direct / Elsevier Singapore Pte Ltd, Singapore.

Fischer-Friedrich Elisabeth et al: "Rheology of the Active Cell Cortex in Mitosis", Biophysical Journal 111, 589-600, Aug. 9, 2016, Biophysical Society, Rockville, MD, US.

* cited by examiner

APPARATUS AND METHOD FOR DETERMINING MECHANICAL PROPERTIES OF A SYSTEM

The invention relates to an apparatus for determining mechanical properties, more particularly rheological properties, of a system, having an oscillatable contact element.

The invention further relates to an apparatus for determining mechanical properties, more particularly rheological properties, of a system, which apparatus has a contact assembly for contacting the system, having equipment for photothermally exciting the contact assembly and having equipment for detecting vibrations on the excited contact assembly.

The invention also relates to a method for determining mechanical properties, more particularly rheological properties, of a system.

The invention further relates to a use of two adjacent cantilevers.

The invention moreover relates to a use of a system or of a biological system.

Measuring apparatus of the type in question for determining the mass and/or mechanical properties of a biological system, for example, are known from the prior art. Thus, for example, WO 2015/120992 A1 describes measuring apparatus which is equipped with a micro-cantilever designed to adhere to a biological system, such as a cell or a group of cells. The micro-cantilever, with the biological system adhering thereto, is excited into vibration for this purpose by means of a first laser device comprising an intensity-modulated light source, while the vibrations generated in said micro-cantilever are detected by means of a second laser device comprising an optical pass filter.

The object of the invention is to further develop measuring apparatus and measuring techniques of the type in question, more particularly to improve the determination of mechanical properties of a biological system and especially to allow rheological properties to be determined with greater precision.

The problem addressed by the invention by an apparatus for determining mechanical properties, more particularly rheological properties, of a system, having an oscillatable contact element and having a further contact element, in which apparatus the two contact elements are arranged in such a manner relative to one another that they can be operatively connected to one another by means of the system, having a device for photothermally exciting the oscillatable contact element, and having a device for detecting vibrations in the excited oscillatable contact element, wherein both the excitation device and the detection device interact with the oscillatable contact element, wherein the oscillatable contact element and the system can be excited to oscillate with different frequencies and/or with one or more frequency sweeps.

Because the system is simulataneously in operative contact with both contact elements, of which contacts at least one can be photothermally excited into vibration, not only can mechanical properties of the system be determined with particular precision, but the apparatus is also particularly simple to construct. This is more so the case if the oscillatable contact element and the system is excited to oscillate with different frequencies and/or with one or more frequency sweeps.

By contrast with the oscillatable contact element, the further contact element is designed or retained rigidly in such a manner that the further contact element is designed to be not oscillatable, or only oscillatable to a negligibly low degree or an intended excitation to oscillate on the further contact element as intended in the invention would only be initiated insufficiently and/or would not be detectable.

The further contact element can hence consist of a substrate and the oscillatable contact element can consist of a suitably designed cantilever, for example.

Thus, within the meaning of the invention, the system to be measured can be integrated on a substrate, on an oscillatable contact element or cantilever, or retained between the two, even in a non-stick manner.

A substrate of this kind can, for example, be fixed to a base of a Petri dish.

At this point it should now also be explained that the term "rheology", for the purposes of this invention, describes the characterization of the frequency-resolved or frequency-dependent mechanical properties of the system. In other words this means that, using the present invention, frequency-resolved, viscoelastic properties of the system can be determined with particular precision.

This means that frequency-dependent characterizations with respect to a system correspondingly to be examined are achieved within the meaning of the present invention.

The problem addressed by the invention is likewise solved by an apparatus for determining mechanical properties, more particularly rheological properties, of a system, which apparatus has a contact assembly for supporting the system, having equipment for photothermally exciting the contact assembly and having equipment for detecting vibrations on the excited contact assembly, wherein the contact assembly has a first oscillatable contact element and a second oscillatable contact element, which are disposed in respect of one another in such a way that the system for determining the mechanical properties can be arranged on both contact elements simultaneously.

More particularly, by means of two contact elements corresponding well with each other in mechanical terms through the system, rheological properties of the system can also be measured and determined extremely simply and precisely in a frequency-dependent manner. Using the measured rheological properties, other mechanical properties of the system under examination can then also be again verified or determined more precisely.

In other words this means that frequency-dependent characteristic properties of a correspondingly more complex system can be determined using the present apparatus.

A more precise determination of characteristic properties of the system can also be made with this alternative apparatus if the oscillatable contact element, or the system in contact therewith, can additionally be excited to oscillate with different frequencies and/or with one or more frequency sweeps.

In this respect, the present invention relates to a structure for the frequency-dependent determination of mechanical properties of cells, a biological system etc., for example, wherein a system of this kind is placed on a substrate, for instance, and wherein a contact element is mechanically stimulated into vibration and also the mechanical reaction to this is detected means of a flexible element, and also by a present contact element, more particularly a cantilever.

It has been demonstrated that a significantly improved stimulation can be generated by, in particular, photothermal excitation, as a result of which a very clean, or precise, simulation signal can be provided, by contrast with stimulation by means of a piezo-electric component, for instance, which acts either on a specimen or on a system or completely on a bracket for said specimen or system which holds the oscillatable contact element.

At this point it should be explained once again clearly that it is particularly advantageous if not only the device for exciting vibrations, but also the device for detecting vibrations operates contactlessly in respect of the contact element concerned, more particularly by means of electromagnetic light waves.

In this case the two contact elements are operatively connected for vibration by means of the system. This means that the oscillation of the first contact element exerts a mechanical force on the system, more particularly on a living cell, wherein the system transfers this oscillation to the second contact element, for example.

The characterization of the transduction occurring between the two contact elements permits, as a result of the design, but also process-relatedly, very precise extraction of mechanical properties of the system and preferably also of rheological properties of the system.

The present apparatus has to this end a coupling element between the first contact element and the second contact element, to allow it to transfer vibrations between the contact elements, preferably from the first contact element to the second contact element, wherein the coupling element comprises the present system.

The system under examination here does not necessarily have to adhere to one or both contact elements. An operative connection, of whatever kind, is sufficient. The system thus merely needs to be held between the contact elements with contact.

In this way, vibrations generated can be influenced by means of the mechanical properties of the system under examination.

For the purpose of this invention, the concept of "system" essentially describes any biological specimens. A possible system of this kind can, therefore, more particularly consist of a biological system, or even practically any other system or viscoelastic system, such as a hydrogel, polymer or the like.

More particularly, a system provided within the meaning of this invention can consist in a cell, a group of cells, or a small tissue or the like, more particularly of mammals.

Specifically, the biological system present can also comprise a HeLa cell or components of the cell.

Typical specimens are, in this case, biological specimens, such as tissue, cells, polymer specimens such as rubber, varnishes, photoresists or similar materials which have viscoelastic properties.

The invention thus also relates specifically to an apparatus and a method for determining mechanical properties, more particularly rheological properties, including of viscoelastic systems.

In any event, the present systems are characterized by a plurality of extensive, that is to say frequency-dependent, phenomena, as are inherent in, in particular, polymers, cells, slurries, foams etc., through which a system of this kind differs from a simple Newtonian fluid or the like, for example.

Frequency-dependent characterizations of a system can be determined particularly easily and precisely if the device for photothermal excitation is configured such that an oscillatable contact element can be excited with different frequencies concurrently.

A particularly precise frequency-dependent characterization, as occurs in this invention, can be achieved if oscillatable contact elements are excited contactlessly or, specifically photothermally.

The contact assembly can be designed in many different ways, particularly in respect of its contact elements, for the purposes of the invention. The contact assembly can here have a plurality of such contact elements or contact element pairs, which match one another. In this case, two contact elements together form a contact element pair.

It is self-evident that the contact elements can be designed in very different forms, as long as they are capable on the one hand to enter into an operative contact with a system as described in the invention or to adhere to a system as described in the invention and, on the other hand, are able at least partially to oscillate as specified in the present invention.

More particularly, the specific contact element, or a contact part thereof and/or a contact face or adhering face thereof on an end or side facing the system to be contacted can be designed with a wide variety of geometrical forms. By way of an example only, it should be mentioned here that, in addition to a contact part roughly flat or planar in form or a corresponding contact and/or adhering face, other shapes can be used, such as a pyramid-like tip form, a frustoconical form with a planar or concavely curved end or the like, a wedge shape, a sphere, a cylinder shape or the like. Combinations of different shapes can also be formed on a contact element to allow additional synergies, effects or advantages to be achieved. It is obvious that the selection of the possible forms and shapes in respect of the contact element can go beyond the variations mentioned above by way of example.

A simply designed embodiment variant can provide that a contact element comprises a substrate with a system or a biological system.

This preferably involves a cantilever-based apparatus or even a cantilever-based method, as will be described below.

One specific embodiment variant provides that the first contact element and/or the second contact element each comprises a cantilever, more particularly a micro-cantilever.

A cantilever of this kind is preferably designed as a "cantilever arm" clamped at one end on a clamping base, wherein the cantilever can possibly have a rectangular or even triangular-shaped main body.

For example, one of the contact elements could also be realized in a different design. More particularly, the second contact element could be implemented as a base plate element mounted for oscillation. Preferably, both contact elements are designed as cantilevers.

The contact elements or cantilevers, and in particular a contact or adhesion face thereof, are here preferably modified physically or chemically to have the function of being able to adhere to the system or biological system.

The contact elements are preferably 10 $\mu$m to 1000 $\mu$m in length and preferably 10 $\mu$m to 100 $\mu$m long, as a result of which the system can reliably interact with the contact assembly or adhere to the contact assembly.

Furthermore, the oscillatable contact elements present have a resonant frequency of 1 Hz to 10 MHz and preferably from 20 kHz to 1200 kHz, on immersion in a fluid from 1 kHz to 400 kHz, so that the widest variety of systems can be examined with the present apparatus without problem.

Moreover, oscillatable contact elements have, for the purpose of the invention, a vibration amplitude of 0.01 nm to 300 nm and preferably less than 30 nm, so as to be able, hereby, to examine well the rheological properties of the system in particular.

The contact elements preferably each have an upper strut and a lower strut, which can run to a tip, wherein one of the struts is preferably aligned horizontally, specifically the strut which is intended for contacting or adhering to the system.

The specific sensitivity to oscillation can be increased if oscillatable contact elements are made thicker at their clamping ends, with which they are clamped to a base, than at their freely oscillatable contact element ends opposite their clamping ends.

The clamping ends of the contact elements here are disposed opposite one another in such a manner that contact elements collaborating as a contact element pair at least partially overlap; specifically in the area of their freely oscillatable ends.

One particularly preferable embodiment variant provides that the first contact element and the second contact element are operatively connected by the system, as in this way, in particular, rheological properties of the system can be determined reliably and precisely.

The system can be particularly advantageously examined if a receiving space for a common system is arranged between the first contact element and the second contact element. More particularly, the first and the second contact element can be operatively connected to one another with a single system, particularly in an oscillating manner.

The receiving space is here designed for the arrangement of a physical vibration transmission medium. A vibration transmission medium of this kind can here be advantageously provided by means of the present system.

The receiving space is here bounded in space at least by the first contact element on the one hand and by the second contact element on the other hand.

A reliable operative connection of the first and the second contact element can be ensured by means of an oscillating system if contact faces or adhering faces functionalized on the contact elements and the receiving space are at least partially coincidently arranged to this.

It is, moreover, advantageous if the receiving space is actively variably adjustable. As a result of a variably adjustable receiving space of this kind, the system can be actively clamped, as required, more firmly or less firmly between the contact elements, with the intensity of clamping being actively adjustable. In this way, the system can be treated in different ways in respect of retaining or clamping forces for different examinations.

It is also advantageous if the receiving space is actively adjustable depending on the system, so that the present apparatus can be adjusted as precisely as possible to the particular system under examination.

A variably adjustable receiving space according to the invention can be achieved, for instance, by at least one contact element being displaceable or movable, preferably both contact elements of a contact element pair, being displaceable or movable towards one another, for example by means of rotary and/or translatory movement.

In this sense, the concept "actively variably adjustable" describes an initial state or operating state in which the receiving space can be modified independently of the vibrations of at least one contact element.

In the case of an apparatus configured accordingly, it is particularly expedient if the effect of an excitation of the first contact element can be detected on said first contact element or on the second contact element to determine the mechanical properties of the system. Rheological properties in particular can be especially well determined in this way.

Moreover, it is advantageous if the first contact element is designed as a master contact element which is actively excited from the outside with an excitation laser to generate a specific oscillation on the contact assembly. The second contact element, on the other hand, is the slave contact element, which is either rigid in design, or interacts with a read laser to detect or to measure the oscillation achieved on the contact assembly.

Consequently, the invention has a common excitation and read contact element (master) and a support contact element (slave), or an excitation contact element (master) and a read contact element (slave), which are preferably designed differently from one another, or as separate oscillating components of the present apparatus.

A distance between two contact elements is advantageously set, or capable of being set, as a function of a thickness or a diameter of the system.

Moreover, it is advantageous if the first contact element and the second contact element are arranged spaced apart from one another, particularly by their contact and/or adhering faces, at a distance of less than 25 or 20 µm, preferably of 16 µm. By selecting distances of this nature, the contact elements of a contact element pair can be arranged close enough to each other to hold the system securely between the contact elements. In particular, the rheological properties of the system can be determined very reliably by oscillation with distances selected in such a range.

In this context, it is furthermore advantageous if the first contact element and the second contact element are arranged spaced apart from one another, particularly by their contact and/or adhering faces, at a distance of more than 10 µm, preferably of more than 15 µm. Distances of this kind allow the risk of measuring errors to be avoided, for example to the effect that the second contact element is critically falsely set in vibration directly by an oscillating first contact element and not only exclusively or predominantly indirectly by means of the adhering system.

It is expedient if a preset distance can be actively modified to be able to adapt or adjust the apparatus for different systems or for an operation during a determination of the system. In this way, on the one hand the distance, and on the other hand the receiving space, too, can be variably adjusted as a function of a specific system to be examined or a biological system.

Furthermore it is advantageous if two contact elements interacting with one another through a system, that is to say a contact element pair, are functionalized or designed for contacting or adhering to the system on different sides, wherein these different sides are arranged directly opposite one another. In this way, a concurrent interaction of the system with two contact elements is particularly simply ensured by design means, particularly if both contact elements are designed as cantilevers.

In this context, it is expedient, on the one hand, if the first contact element is arranged above the second contact element and is functionalized for contacting or adhering to the system on its underside.

On the other hand, it is expedient here if the second contact element is arranged beneath the first contact element and is functionalized for contacting or adhering to the system on its upper side.

It is, thus, also particularly expedient in respect of the design if the first contact element and the second contact element have contact and/or adhering faces on different sides, wherein the contact and/or adhering faces of the first and second contact elements are arranged opposite and coincident with one another.

If the first and the second contact element are arranged running parallel to one another, particularly by their contact and/or adhering faces, the system can interact uniformly with both contact elements. In this way, the quality of the determination of mechanical properties or of rheological properties in particular can also be substantially improved.

If the first and the second contact element are arranged at an angle to a horizontal, particularly in respect of their contact and/or adhering faces, the rheological behaviour of the system in particular can additionally be modulated.

The device for exciting the contact assembly can also be created in a different design. Particularly precise and hence reliable excitation can advantageously be achieved if the device for exciting the contact assembly has a light source (laser) the intensity of which can be actively modulated. Contactless excitation of the first contact element can be achieved well by a laser in particular, as a result of which mechanical interference can be effectively reduced or completely excluded.

Consequently, it is advantageous if the excitation device here comprises a photothermal excitation device, by means of which a substantially more precise oscillation excitation can be initiated than previously.

For example, higher frequencies can also be achieved than in the case of piezo-excitation, since a resonant frequency of a contact element designed as a cantilever, for instance can be higher than that of a piezo-element for generating corresponding vibrations.

Moreover, together with a photothermal excitation device, which interacts with a contact element as described in the present invention, a lesser acoustic excitation can be achieved in other components which are coupled by a medium around the contact element. More particularly, if a measurement is taken in a fluid which is practically incompressible, significant advantages arise over piezo-excitation, since a "wall of peaks" is generally caused by means of a piezo-excitation on the contact element of this nature.

Additionally, it is advantageous if the excitation device comprises a device for generating a frequency sweep in one or more frequency ranges.

For example, in a frequency sweep of this kind, a preselected frequency range can preferably be passed through continuously, as a result of which mechanical properties of a system can be particularly advantageously determined.

Here the different frequencies or frequency sweeps can advantageously be generated by means of photothermal excitation.

The frequencies used here can be chosen in various ways, more particularly as a function of a system to be examined.

In any case, as specified by the invention, frequencies in the range from, for instance, 1 Hz to a few hundred kHz can be used, particularly according to the system to be examined, the device for exciting or detecting vibrations, the contact element form, the operative connection between contact elements chosen and the system to be examined, or the like.

It has been found that advantageous excitations of the first contact element and hence also of the system can be achieved if the light source, the intensity of which can be modulated (excitation laser), operates at a wavelength between 350 nm and 1000 nm.

A preferred excitation of the first contact element, however, occurs at a wavelength of 405 nm or 785 nm, as a result of which the rheological properties of the system in particular can be especially well determined.

At a wavelength of around 405 nm, a lower light energy or a correspondingly lower electromagnetic radiation is required to reach a desired amplitude of vibration.

A wavelength of or around 785 nm is, on the other hand, less phototoxic, for biological systems, for example, and moreover can be more favourably combined with fluorescence.

In this event, it is advantageous, if the device for exciting the contact assembly creates on the first contact element a contact and/or excitation surface with a diameter between 15 μm and 3 μm, as a result of which a very favourable interaction between the intensity-modulatable light source and the first contact element can be realized. The contact and/or excitation surface here preferably has a diameter of 6 μm, as in this way the system can be treated or excited in a manner particularly advantageous for the determination of rheological properties.

In any event, it is advantageous if the contact and/or excitation surface has a form other than a tip or pyramid-shaped tip, especially a planar form.

However, contact elements with contact tips can also be used for a system if this appears to be more advantageous for a corresponding application area.

It is clear that the device can also be implemented in different designs for the detection of vibrations. This detection device can operate very precisely with the exclusion of external influences if the device for detecting vibrations has a further light source (read laser).

It has been shown that vibrations of the first or second contact element can be detected very precisely by optical means using a wavelength between 750 nm and 900 nm. An oscillation of the system in this respect can be detected in a particularly interference-free and hence precise manner, especially at a modulated wavelength of 852 nm.

An advantageous read sensitivity will also result if the device for detecting vibrations generates a read surface on the second contact element with a diameter between 15 μm and 30 μm.

Particularly good sensitivity to the determination of rheological properties, especially of a cell biological system, can be achieved with a read surface of 21 μm in diameter.

The problem addressed by the invention is also solved by a method for determining mechanical properties, especially rheological properties, of a system in which method the system is arranged between two contact elements, and in which at least one contact element of the two contact elements is excited into oscillation photothermally and vibrations of the excited contact element are detected while the two contact elements are operatively connected to one another by the system, wherein the oscillatable contact element or the system is excited to oscillate with different frequencies and/or with one or more frequency sweeps.

Using this method, the system can be characterized, particularly in rheological terms, particularly easily yet highly precisely, since the system under examination influences the vibrations in such a manner that conclusions as to the mechanical properties of the system may be drawn in the method, especially if the oscillatable contact element is excited into oscillation contactlessly photothermally with different frequencies cumulatively or alternatively with one or more frequency sweeps.

In this case the system under examination or at least parts thereof to be examined can take on a function of a vibration transmitter, or more accurately a vibration damper.

It is self-evident that frequency sweeps can differ in design. It is advantageous if a frequency range is passed through continuously in the frequency sweeps.

The problem addressed by the invention is further overcome by an alternative method for determining mechanical properties, more particularly rheological properties, of a system (2), more particularly a biological system, in which method the system is set in oscillation photothermally by a primary vibration, wherein a secondary oscillation is generated by means of the system, by means of which oscillation the mechanical properties of the system are determined.

In this method, the system takes on the function of a vibration transmitter or vibration damper from an excitation side to a read side, meaning that rheological properties of the system, in particular, can be determined precisely.

Advantageously, in this case vibrations on the read side and vibrations initiated on the excitation side can be simultaneously detected here, as a result of which mechanical and specifically rheological properties of the system can be continuously measured and determined.

In other words this means that frequency-dependent characteristic properties of more complex systems can be determined using the present method.

A preferably used method variant here provides that the primary oscillation is generated on a first contact element functionalized for the system, wherein the secondary oscillation is detected on a second contact element functionalized for the system. The excitation side can be particularly simply implemented both in respect of design and of the process by the first contact element. The same is true here for the read side with the second contact element.

The problem addressed by the invention is alternatively also overcome by a method for determining mechanical properties, more particularly rheological properties, of a system, more particularly a biological system, in which method mechanical properties are detected by the transmission by the system of vibrations from a first contact element excited into oscillation onto a second contact element.

Because the system is arranged as a vibration transmission medium between two contact elements for said system, rheological properties of said system, in particular, can also be determined more precisely.

The problem addressed by the invention is furthermore also overcome by a method for determining mechanical properties, more particularly rheological properties, of a system, more particularly of a biological system, in which method the system is arranged on a first oscillatable contact element and on a second oscillatable contact element, more particularly by adhesion, in which method the first contact element is primarily excited into oscillation, wherein the primary oscillation excitation of the first contact element is transferred by means of the system onto the second contact element, and in which the secondary oscillation excitation generated hereby on the second contact element is detected, as a result of which the mechanical properties of the system are determined by means of the secondary oscillation excitation.

The two contact elements here preferably each oscillate as vibrating elements in the form of cantilevers, wherein the two contact elements are operatively connected for vibration by means of the system, as a result of which rheological properties of the system can, in particular, also be determined precisely.

Hence, it is advantageous, if the excitations of the first contact element are detected on the second contact element to determine the mechanical properties of the system.

Especially precise measurements can be made by means of the method if the vibrations are generated by photothermal means.

In any event, it is advantageous if the system is excited by a primary oscillation, wherein a secondary oscillation is generated by the system, by means of which oscillation the mechanical properties and especially the rheological properties of the system are determined.

It should also be noted at this point that the invention is particularly founded on the knowledge that it is advantageous for the determination of mechanical and especially rheological properties of a system if a coupling element is generated by means of said system between the first contact element and the second contact element.

A particularly preferred method variant provides that the oscillatable contact element or the system is excited to oscillate with different frequencies and/or with one or more frequency sweeps, as a result of which mechanical properties of the system can be determined in a particularly multi-layer and precise manner according to the invention.

In a frequency sweep of this kind, a preselected frequency range is preferably passed through continuously, as a result of which mechanical properties of a system can be determined very well.

A significant increase in the resolution of the present method can be achieved if different frequencies are applied concurrently. In this way a clear improvement in the present method can alternatively be achieved, by contrast with methods in which, for example, merely a sequence of frequencies is used.

The methods can be performed even more advantageously if mechanical or rheological properties of the system are determined in a frequency-resolved or frequency-dependent manner.

This amounts advantageously to frequency-dependent methods for determining rheological properties of systems in accordance with the invention, such as biological systems or viscoelastic systems of interest for materials science, in particular.

The different frequencies or frequency sweeps can here advantageously be generated by means of photothermal excitation.

To this extent it is advantageous if the oscillatable contact element or contact element which can be excited into oscillation is excited by photothermal means.

A different method variant yet further provides that the system is first brought into operative contact with the first contact element to determine the mass of the system, and only subsequently is the system additionally brought into operative contact with the second contact element to additionally determine mechanical properties or rheological properties of the system. With this preferred method variant, both the mass and also further mechanical properties of the system can be ascertained or determined in one execution of the method.

The present methods can be executed particularly advantageously with the correspondingly configured apparatus of this invention.

The problem addressed by the invention is also overcome by a use of two adjacent cantilevers for simultaneously retaining a system, more particularly a biological system, during the determination of mechanical properties, more particularly rheological properties.

As already mentioned multiple times, the present system can hereby be examined more extensively or even more precisely.

The problem addressed by the invention is also a use of a system, more particularly a biological system, for creating a coupling element for damping and/or transmitting vibrations between two contact elements of a contact assembly for carrying said system on an apparatus for determining mechanical properties.

In this way, with the aid of the coupling element and the transmission of vibrations rendered possible thereby, it is particularly easy, as a result of the design and process engineering means, to be able to examine a system in respect of mechanical and especially rheological properties.

Because of this use of the system as a coupling element it is possible to omit from the apparatus an additional mechanical component for setting contact elements in vibrations.

Moreover, in the present invention the system can be used as a damper element for damping an externally excited vibration system.

In other words: the present apparatus includes a damper element in the form of a system for damping an oscillation excitation.

Overall, it may be stated that rheological properties of a system or of a biological system can be determined very well by means of the present invention, wherein further properties of the system, more particularly mechanical properties, can be determined through the knowledge gained in this way.

It should again be noted here that, for the purposes of the patent application here present, indefinite articles and indefinite numerical statements such as "a", "two" etc. should, as a rule, be understood as minimum statements, that is to say as "at least one . . . ", "at least two . . . " etc., unless it is evident somehow from the context or the actual text at a specific point that somehow only "precisely one . . . ", "precisely two . . . " etc. is intended.

It should also be mentioned at this point that, for the purposes of the present patent application the expression "more particularly" should always be understood such that an optional, preferred feature is being introduced with this expression. The expression is not to be understood as "and specifically" and not as "namely".

Moreover, let it be further claimed that the methods described can also yet be extended by further technical features described here, particularly by features of the apparatus, to advantageously further develop the methods or to be able to present or formulate the method specifications even more precisely.

Let it be explicitly mentioned at this point, that the present invention can be implemented particularly advantageously in terms of both design and process technology, particularly through, in the first place, rheology by means of AFM, secondly through photothermal excitation for the direct excitation of a contact element and thirdly through the frequency sweeps tuned to the system in question, by contrast for example with excitation of a specific volume of frequencies combined sequentially or in parallel, wherein the excited vibrations are detected preferably directly on the excited contact element or alternatively on a further contact element operatively connected via a system to the excited contact element.

It is clear that the features of the solutions described above or in the claims can also be combined, if necessary, to allow the advantages and effects achievable to be exploited in a correspondingly cumulated manner.

A combination of frequency-dependent characterization or determination of frequency-dependent properties and photothermal excitation of at least one contact element is especially advantageous, since an extremely precise oscillation excitation also advantageously favours a particularly precise determination of properties of the system.

Further features, effects and advantages of the present invention are explained on the basis of the enclosed drawing and the description below in which an apparatus for the frequency-dependent determination of mechanical properties of a biological system is presented and described by way of example.

Components which at least substantially coincide in respect of the function in the individual figures can here be identified with the same reference sign, wherein the components do not have to be referenced and explained in all the figures.

Figure 3:
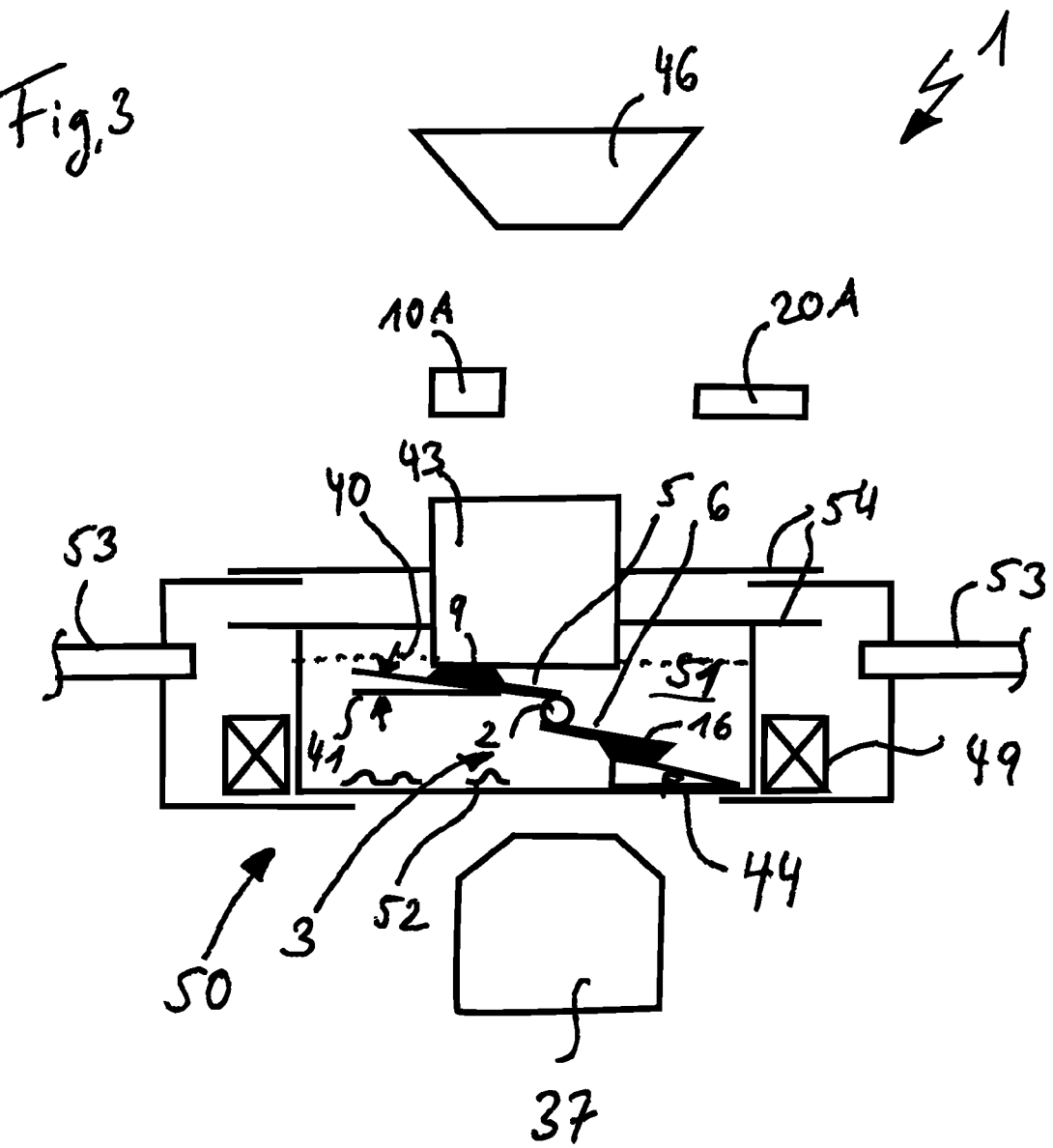
Figures 4, 5, 6:
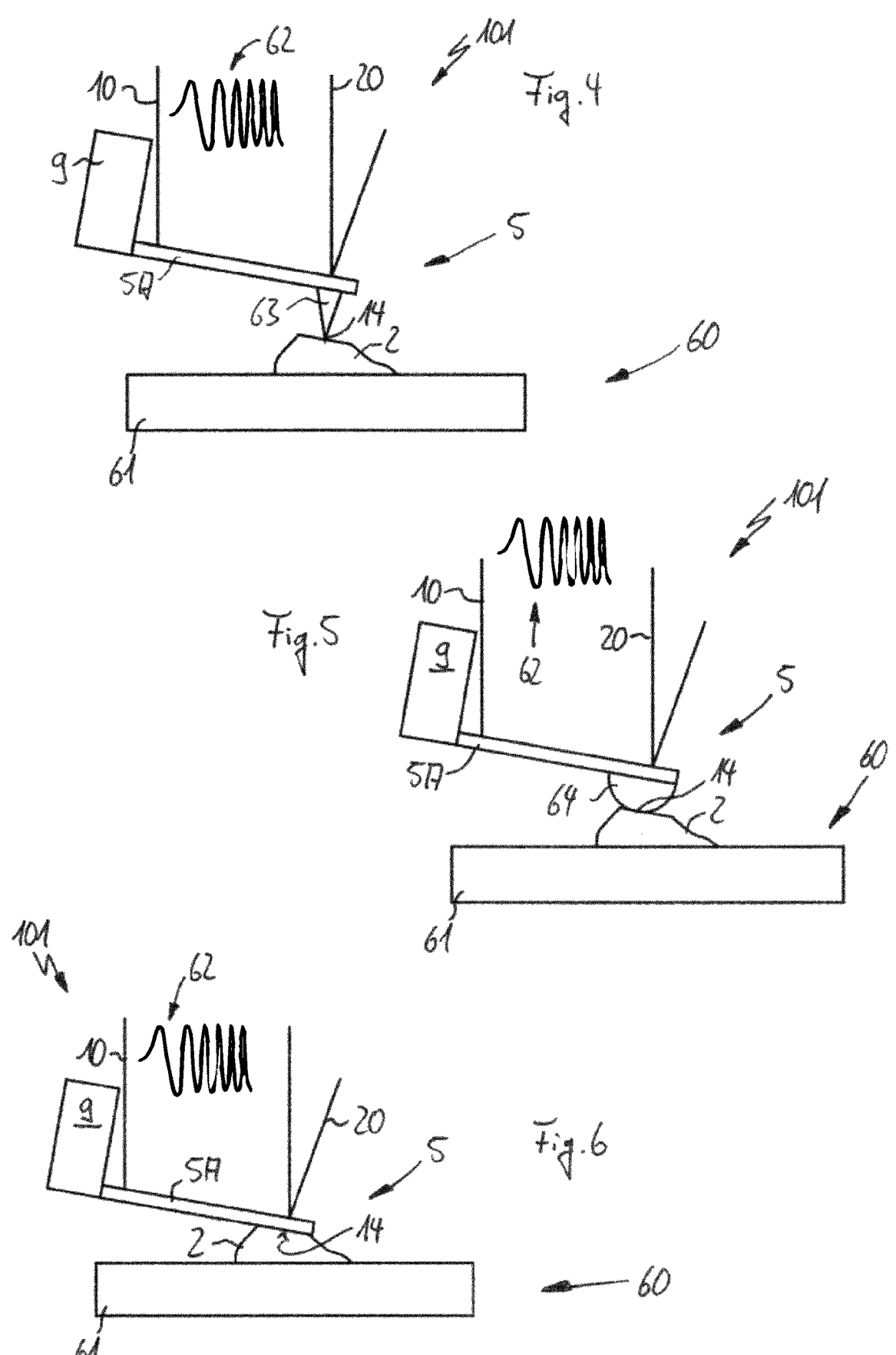

The drawing shows:

FIG. 1 Diagrammatically, a partial view of measuring apparatus for the frequency-dependent determination or frequency-dependent characterization of mechanical properties, more particularly rheological properties, of a system, in respect of the contact assembly thereof for contacting the system with two contact elements for together contacting or holding the system;

FIG. 2 Diagrammatically a further view of the contact assembly of FIG. 1 with a system arranged simultaneously on the two contact elements;

FIG. 3 Diagrammatically, an extended view of the measuring apparatus of FIGS. 1 and 2;

FIG. 4 Diagrammatically, a partial view of a preferred measuring apparatus for the frequency-dependent determination or frequency-dependent characterization of mechanical properties, more particularly rheological properties, of a system, in respect of the contact assembly thereof with an oscillatable first contact element comprising a tip-shaped contact or bearing face and with an opposite, non-oscillatable or inherently stiff, further contact element;

FIG. 5 Diagrammatically, a partial view of the measuring apparatus from FIG. 4 in an alternative configuration having a semicircular contact or bearing surface on the oscillatable, first contact element; and FIG. 6 Diagrammatically, a partial view of the measuring apparatus from FIG. 4 in a different configuration having a completely flat contact or bearing surface on the oscillatable, first contact element.

The measuring apparatus 1, only partially shown in FIGS. 1 to 3, for the frequency-dependent determination of mechanical or rheological properties of a system 2 (see FIGS. 3 and 4) has a contact assembly 3 for holding or supporting said system 2. The system 2 is in this case, by way of example, a biological system 2.

The biological system 2 is a cell (not identified with a reference sign) from a mammal which cell it is intended to examine, particularly with respect to its rheological properties.

The contact assembly 3 comprises in this first embodiment a first oscillatable contact element 5 and a second oscillatable contact element 6, on which the biological system 2 can act simultaneously and, if necessary, to which it can also adhere.

The first contact element 5 is here designed as a master cantilever 5A, which is arranged on a base 9 as a projecting arm and which can be excited into oscillation by an excitation laser 10 with a wavelength of 405 nm from an intensity-modulated light apparatus which is not shown in greater detail, wherein the intensity-modulated light apparatus is assigned to a device 10A for exciting the contact assembly 3.

In particular, different frequencies can hereby be generated concurrently or simultaneously on the contact assembly 3.

The master cantilever 5A has, in this embodiment example, a triangular main body 11 consisting of two individual struts 11A and 11B running to a tip, such that the first contact element 5 has particularly good oscillation properties on its freely oscillatable end 12.

The first contact element 5 is functionalized on its underside 13 with a first adhering face 14 of the contact assembly 3 in such a manner that the biological system 2 can adhere there particularly well.

The second contact element 6 is, on the other hand, designed as a slave cantilever 6A, which is arranged on a further base 16 as a further projecting arm. Vibrations of this slave cantilever 6A can be detected and read by a read laser 20 with a wavelength of 852 nm of a further light apparatus which is not shown in greater detail. The further light apparatus is here assigned to a device 20A for detecting vibrations on the contact assembly 3.

The slave cantilever 6A has likewise, in this embodiment example, a triangular main body 21 consisting of two further individual struts 21A and 21B of the contact assembly 3 which run to a tip, such that the second contact element 6 likewise has very good oscillation properties on its freely oscillatable end 22.

The second contact element 6 is functionalized on its upper side 23 with a second adhering face 24 of the contact assembly 3 in such a manner that the biological system 2 can also adhere to the second contact element 6 well.

The two contact elements 5 and 6 are, in this embodiment example, more particularly also arranged spaced apart from one another in respect of their adhering faces 14 and 24 at a distance 27 of 16 μm.

The distance 27 is here measured from the underside 13 or the first adhering face 14 of the first contact element 5 to the upper side 22 or the second adhering face 24 of the second contact element 6, with the two contact elements 5 and 6, or more accurately the underside 13 (lower strut 11B) and the upper side 23 (further upper strut 21A) being aligned parallel to one another.

The two contact elements 5 and 6 overlap in the region of their freely oscillating ends 12 and 22, as a result of which a receiving space 28 is created for the biological system 2 (see FIGS. 2 and 3) on the contact assembly 3.

The two contact elements 5 and 6 thus form a contact element pair 30, by means of which the biological system 2 can be retained in a freely oscillating manner at least on two sides in the measuring apparatus 1 and in the space.

According to the illustrations of FIGS. 2 and 3 it is clearly evident that the biological system 2 adheres to both contact elements 5 and 6 simultaneously for the determination of the rheological properties of the system in particular.

The first contact element 5 and the second contact element 6 are hence operatively connected with one another by the biological system 2, specifically in a manner such that vibrations of the first contact element 5, excited by the excitation laser 10 are transferred to the second contact element 6, and the vibrations thereof are, for their part, detected by the read laser 20. Thus a frequency-dependent characterization of the biological system 2 can be undertaken here with particular precision in combination with a photothermal excitation.

This means that the biological system 2 is a mechanical coupling element 35 of the contact assembly 3 which is clamped between the two contact elements 5 and 6.

FIG. 2 furthermore shows a microscope apparatus 37 which is placed underneath the contact assembly 3.

The extended representation in FIG. 3 additionally shows in respect of the measuring apparatus 1 that the contact assembly 3 alternatively can be aligned at an angle 40 to a horizontal 41. To this end, the measuring apparatus 1 has correspondingly adjustable holding devices 43 and 44, which comprise the bases 9 or 16 for the contact elements 5 and 6.

The microscope apparatus 37 also has lighting 46 by means of which light can immediately be shone through the biological system 2 for further morphological examinations.

Thus a frequency-dependent characterization of the biological system 2—or even of another system—can be undertaken with particular precision in combination with a photothermal excitation and a microscope apparatus 37.

The measuring apparatus 1 further also has a double chamber 50 which can be heated by a heating system 49 to condition the environment 51 to an optimum in respect of temperature, humidity and atmosphere etc. for the biological system 2 and the relevant Petri dishes 52 for storing further biological systems 2. The double chamber 50 also has gas ports 53 and caps 54.

The variations shown in FIGS. 4, 5 and 6 of an alternative measuring apparatus 101 for the frequency-dependent determination of mechanical or rheological properties of a system 2 substantially match, in respect of design, the measuring apparatus 1 shown in FIG. 1. Reference is thus additionally made to the explanations above with respect to features, advantages and effects. The present system 2 is likewise a biological system 2, wherein a different system can also be used within the scope of the invention.

The alternative measuring apparatus 101 now at least partially illustrated in FIGS. 4, 5 and 6 is characterized by a somewhat differently designed contact assembly 3, which has, on the one hand, an oscillatable, first contact element 5 which is mounted in a base 9. On the other hand, the somewhat differently designed contact assembly 3 has a further contact element 60 which has a sufficiently high inherent stiffness such that, by contrast with the oscillatable, first contact element 5 it cannot be excited within the meaning of the invention, at least not by means of the excitation laser 10, with which the oscillatable, first contact element 5 can be contactlessly photothermally excited.

According to the alternative measuring apparatus 101, the further contact element 60 is implemented in a substrate 61 which encompasses the system 2, while the oscillatable, first contact element 5 is designed as cantilever 5A, as before. The alternative measuring apparatus 101 is hence simpler to construct than the previous measuring apparatus 1.

By contrast with the measuring apparatus 1 of FIGS. 1 to 3, in the alternative measuring apparatus 101, both the excitation laser 10 (excitation device 10A; cf. FIG. 1) and also the read laser 20 (detection device 20A; cf. FIG. 1) communicate only with the oscillatable, first contact element 5 contactlessly, wherein the excitation laser 10 here provides a frequency sweep 62 with rising frequency.

In particular, different frequencies can hereby be generated concurrently or simultaneously on the contact element 5.

While in the embodiment according to FIG. 4 the oscillatable, first contact element 5 contacts the system 2 with a pointed or pyramid-shaped contact face 14 or with a correspondingly pointed or pyramid-shaped contact part 63, the contact face 14 or a corresponding contact part 64 is instead spherical in design in the embodiment in accordance with FIG. 5. The substantially semicircular contact face 14 or the corresponding contact part 64 can be formed by a lower half of a sphere or also by an end of a different shape which can be described by a semicircle or similar.

The embodiment in accordance with FIG. 6, on the other hand, shows an embodiment in which the oscillatable, first contact element 5 has a planar contact face 14 for communicating with the system 2 or similar.

In particular in respect of the embodiments in accordance with FIGS. 4 and 5, alternative systems which are flat, such as a polymer film, for instance, can also be used. In other words: the system 2 shown in FIGS. 4 and 5 can be characterized as an alternative system by a horizontally extending, flat design, for example a flat rectangle, which preferably completely covers the contact element or the substrate 61, at least in respect of the side facing the master cantilever or cantilever.

It should be explicitly mentioned at this point that the features of the solutions described above or in the claims and/or figures can also be combined, as necessary, to implement or allow achievement of the features, effects and advantages mentioned in a correspondingly cumulative manner.

It is clear that the exemplary embodiments explained above are merely initial designs of the invention. To this extent, the design of the invention is not restricted to these exemplary embodiments.

All features disclosed in the application documents are claimed as essential to the invention to the extent that they are novel over the prior art individually or in combination.

REFERENCE SIGN LIST

1 Measuring apparatus
2 Biological system or viscoelastic system of interest for materials science
3 Contact assembly
5 Oscillatable or first oscillatable contact element
5A Master cantilever or cantilever
6 Second oscillatable contact element
6A Slave cantilever
9 Base
10 Excitation laser
10A Device for exciting the contact assembly
11 Triangular main body
11A First single strut or upper strut
11B Second single strut or lower strut
12 Freely oscillatable end
13 Underside
14 First contact or adhering face, pyramid-shaped contact face
16 Further base
20 Read laser
20A Device for detecting vibrations
21 Triangular main body
21A First further single strut or further upper strut
21B Second further single strut or further lower strut
22 Further freely oscillatable end
23 Upper side
24 Second contact or adhering face
27 Distance
28 Receiving space
30 Contact element pair
35 Coupling element
37 Optical microscope apparatus
40 Angle
41 Horizontal
43 Upper holding device
44 Lower holding device
46 Lighting
50 Heatable double chamber
51 Environment
52 Petri dishes 53 Gas ports
54 Cap
60 Further contact element
61 Substrate
62 Frequency sweep
63 Pointed or pyramid-shaped contact part
64 Spherical contact part
101 Alternative measuring apparatus

The invention claimed is:

1. An apparatus for determining rheological, viscoelastic properties, of a biological system or a viscoelastic system, said apparatus comprising:
   a first contact element, which is an oscillatable contact element, and a second contact element arranged in such a manner relative to one another that they are operatively connected to one another by way of the biological system or viscoelastic system when determining the rheological, viscoelastic properties of the biological system or viscoelastic system;
   an excitation device for photothermally exciting the oscillatable contact element; and
   a detection device for detecting vibrations and hence the rheological, viscoelastic properties of the biological system or viscoelastic system in the excited oscillatable contact element, wherein both the excitation device and the detection device interact with the oscillatable contact element, wherein the apparatus is configured to excite the oscillatable contact element and hence the biological system or viscoelastic system to oscillate with different frequencies and/or with one or more frequency sweeps for determining the rheological, viscoelastic properties of the biological system or viscoelastic system in a frequency-resolved or frequency-dependent manner.

2. The apparatus in accordance with claim 1, wherein the excitation device is configured in such a manner that the oscillatable contact element can be excited with different frequencies concurrently.

3. The apparatus in accordance with claim 1, wherein at least one of the first contact element and the second contact element comprises a cantilever.

4. The apparatus in accordance with claim 1, wherein the first contact element and the second contact element are operatively connected by the biological system or viscoelastic system.

5. The apparatus in accordance with claim 1, wherein a receiving space for the biological system or viscoelastic system is arranged between the first contact element and the second contact element, wherein the receiving space is actively variably adjustable.

6. The apparatus in accordance with claim 1, wherein an effect of an excitation of the first contact element can be detected on the first contact element or on the second contact element to determine the rheological, viscoelastic properties of the biological system or viscoelastic system.

7. The apparatus in accordance with claim 1, wherein the first contact element and the second contact element, are arranged spaced apart from one another by contact and/or adhering faces thereof, by a distance of less than 25 μm.

8. The apparatus in accordance with claim 1, wherein the first contact element and the second contact element, are arranged spaced apart from one another by contact and/or adhering faces thereof, by a distance of more than 10 μm.

9. The apparatus in accordance with claim 7 or 8, wherein a preselected distance between the first contact element and the second contact element is actively adjustable.

10. The apparatus in accordance with claim 1, wherein the first contact element and the second contact element interacting with one another through the biological system or viscoelastic system, that is a contact element pair, are functionalized on different sides for contacting or adhering to the biological system or viscoelastic system, wherein these different sides are arranged directly opposite one another.

11. The apparatus in accordance with claim 1, wherein the first and the second contact elements, are arranged at an angle to a horizontal.

12. The apparatus in accordance with claim 1, wherein the excitation device comprises a photothermal excitation device.

13. The apparatus in accordance with claim 1, wherein the excitation device comprises a device for generating a frequency sweep in one or more frequency ranges.

14. A method for determining rheological, viscoelastic properties, of a biological system or a viscoelastic system said method comprising the steps:

arranging the biological system or viscoelastic system between two contact elements, photothermally exciting at least one contact element of the two contact elements and hence the biological system or viscoelastic system into oscillation with different frequencies and/or with one or more frequency sweeps, and detecting vibrations of the at least one contact element that is excited while the two contact elements are operatively connected to one another by the biological system or viscoelastic system for determining the rheological, viscoelastic properties of the biological system or viscoelastic system in a frequency-resolved or frequency-dependent manner.

15. The method in accordance with claim 14, wherein a frequency range is passed through continuously in frequency sweeps.

16. The method in accordance with claim 14, wherein different frequencies are applied concurrently.

17. The method in accordance with claim 14, wherein the oscillatable contact element or the element which can be excited into oscillation is excited photothermally.

18. The method in accordance with claim 14, wherein the biological system or viscoelastic system is initially brought into operative contact with the first contact element to determine the mass of the biological system or viscoelastic system, and only subsequently is the biological system or viscoelastic system additionally brought into operative contact with the second contact element, to additionally determine rheological, viscoelastic properties of the biological system or viscoelastic system.

*    *    *    *    *